United States Patent
Law et al.

(10) Patent No.: US 9,944,521 B2
(45) Date of Patent: *Apr. 17, 2018

(54) HYDROGEN GENERATOR HAVING A THERMAL ACTUATOR

(71) Applicant: Intelligent Energy Inc., San Jose, CA (US)

(72) Inventors: Chad E. Law, Milan, OH (US); Mark D. Vandayburg, Westlake, OH (US)

(73) Assignee: Intelligent Energy Inc., San Jose, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 14/968,705

(22) Filed: Dec. 14, 2015

(65) Prior Publication Data

US 2016/0159646 A1 Jun. 9, 2016

Related U.S. Application Data

(63) Continuation of application No. 13/680,647, filed on Nov. 19, 2012, now Pat. No. 9,243,560.

(51) Int. Cl.
*C01B 3/04* (2006.01)
*H01M 8/065* (2016.01)
(Continued)

(52) U.S. Cl.
CPC .............. *C01B 3/04* (2013.01); *F02C 7/00* (2013.01); *H01M 8/04208* (2013.01);
(Continued)

(58) Field of Classification Search
CPC ... C01B 3/065; H01M 8/065; H01M 8/04208; H01M 8/04216; H01M 8/04201;
(Continued)

(56) References Cited

U.S. PATENT DOCUMENTS 5,262,619 A 11/1993 Karner
6,091,050 A 7/2000 Carr
(Continued)

FOREIGN PATENT DOCUMENTS

CN 1476648 A 2/2004
CN 1481275 A 3/2004
(Continued)

OTHER PUBLICATIONS

U.S. Appl. No. 61/657,909, filed Jun. 11, 2012.
(Continued)

*Primary Examiner* — Imran Akram
(74) *Attorney, Agent, or Firm* — Baker & Hostetler LLP

(57) ABSTRACT

A hydrogen generator having one or more actuators coupled to one or more heating elements in which the actuator(s) are used to improve the transfer of thermal energy from heating element(s) to one or more fuel units contained within the generator. In one embodiment, an actuator allows insertion and/or removal of packaged fuel units without the need of removing the heating element(s) and/or the actuator(s). When the actuator is in a retracted state (e.g., a low temperature state), the packaged fuel unit may be inserted and/or removed from a cavity of the hydrogen generator. When the actuator is in an extended state (e.g., a higher temperature state), the actuator forces contact between itself or the heating element and the fuel unit when a prescribed operating temperature is reached.

24 Claims, 11 Drawing Sheets

(51) Int. Cl.
*F02C 7/00* (2006.01)
*H01M 8/04082* (2016.01)

(52) U.S. Cl.
CPC .......... *H01M 8/065* (2013.01); *Y02E 60/364* (2013.01); *Y02E 60/50* (2013.01)

(58) Field of Classification Search
CPC ... Y02E 60/362; Y02E 60/364; Y02E 60/321; Y02E 60/324; F17C 11/005; F17C 2221/012
See application file for complete search history.

(56) References Cited

U.S. PATENT DOCUMENTS

| | | | |
|---|---|---|---|
| 6,749,702 B1 | 6/2004 | Knowlton et al. | |
| 7,241,527 B2 | 7/2007 | Liu et al. | |
| 7,655,056 B2 | 2/2010 | Devos | |
| 7,867,441 B2 | 1/2011 | Eckels et al. | |
| 7,964,111 B2 | 6/2011 | Perut et al. | |
| 9,243,560 B2* | 1/2016 | Law | C01B 3/04 |
| 2002/0073617 A1 | 6/2002 | Ovshinsky et al. | |
| 2004/0076861 A1* | 4/2004 | Mann | H01M 8/04 429/208 |
| 2004/0214056 A1* | 10/2004 | Gore | C01B 3/065 429/421 |
| 2005/0074643 A1 | 4/2005 | Adams et al. | |
| 2005/0202291 A1 | 9/2005 | Schweizer | |
| 2005/0244683 A1* | 11/2005 | Otis, Jr. | B01J 7/00 429/421 |
| 2006/0174952 A1 | 8/2006 | Curello et al. | |
| 2008/0026269 A1 | 1/2008 | Shurtleff et al. | |
| 2008/0118787 A1 | 5/2008 | Wexel et al. | |
| 2008/0236032 A1 | 10/2008 | Kelly et al. | |
| 2008/0241613 A1 | 10/2008 | Kelly et al. | |
| 2008/0286621 A1 | 11/2008 | Rosenzweig et al. | |
| 2009/0060833 A1 | 3/2009 | Curello et al. | |
| 2009/0078345 A1 | 3/2009 | Kellett et al. | |
| 2009/0324452 A1 | 12/2009 | Salinas et al. | |
| 2010/0012219 A1 | 1/2010 | Shibukawa | |
| 2010/0104481 A1 | 4/2010 | Curello et al. | |
| 2011/0027168 A1 | 2/2011 | Yvart et al. | |
| 2011/0176973 A1 | 7/2011 | Rosenzweig et al. | |
| 2011/0189562 A1 | 8/2011 | Wu et al. | |
| 2011/0197873 A1 | 8/2011 | Weber et al. | |
| 2011/0212374 A1 | 9/2011 | Rosenzweig et al. | |
| 2012/0115054 A1 | 5/2012 | Wallace et al. | |
| 2013/0108940 A1 | 5/2013 | Langan et al. | |
| 2014/0140919 A1 | 5/2014 | Langan | |

FOREIGN PATENT DOCUMENTS

| | | |
|---|---|---|
| CN | 101627250 A | 1/2010 |
| CN | 102006936 A | 4/2011 |
| EP | 1434296 A1 | 6/2004 |
| EP | 1571124 A1 | 9/2005 |
| EP | 2429257 A1 | 3/2012 |
| JP | 2008-215366 A | 9/2008 |
| JP | 2012-082102 A | 4/2012 |
| JP | 2012-084366 A | 4/2012 |
| WO | WO 2014/077868 | 5/2014 |

OTHER PUBLICATIONS

International application No. PCT/US2013/054918: International Search Report and Written Opinion dated Nov. 18, 2013, 10 pages.
International Patent Application No. PCT/US2013/054918; Int'l Preliminary Report on Patentability; dated May 28, 2015; 7 pages.
International Patent Application No. PCT/US2013/021538; Int'l Preliminary Report on Patentability; dated May 28, 2015; 8 pages.
International Search Report dated Aug. 7, 2013; Issued in Int'l Patent Application No. PCT/US2013/021538; dated Apr. 11, 2014; 3 pages.
Diwan et al.; "Combustion wave propagation in magnesium/water mixtures: Experiments and model"; Chemical Engineering Science; vol. 65 Issue 1; Jan. 2010; p. 80-87.
Shafirovich et al.; "Combustion-assisted hydrolysis of sodium borohydride for hydrogen generation"; Int'l Journal of Hydrogen Energy; vol. 32 Issue 2; Feb. 2007; p. 207-211.

* cited by examiner

HYDROGEN GENERATOR HAVING A THERMAL ACTUATOR

CROSS-REFERENCE TO RELATED APPLICATIONS

This application is a Continuation of U.S. patent application Ser. No. 13/680,647 filed Nov. 19, 2012, the entirety of which is incorporated by reference as if fully set forth herein.

TECHNICAL FIELD

This invention relates to a hydrogen generator for providing hydrogen gas, and more particularly to a hydrogen generator having one or more thermal actuators to improve thermal conduction between a heating element and one or more fuel units.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (e.g., a fuel cell stack), and a fuel source, such as a fuel tank or a hydrogen generator. Hydrogen generators that supply hydrogen gas to a fuel cell can be an integral part of a fuel cell system, or they can be removably coupled to the fuel cell system. A removable hydrogen generator can be replaced with another one when the hydrogen containing materials have been consumed. Removable hydrogen generators can be disposable (intended for only a one-time use). Both removable and permanently installed hydrogen generators can be refillable (intended for use multiple times) to replace consumed fuel composition.

Hydrogen generators can produce hydrogen using a variety of hydrogen containing materials and a variety of methods for initiating the hydrogen generating reactants. Hydrogen gas can be released when a hydrogen containing material is heated.

In selecting hydrogen containing materials for use in a hydrogen generator, consideration may be given to the following: (a) stability during long periods of time when the hydrogen generator is not in use, (b) ease of initiation of a release of hydrogen gas, (c) the amount of energy that must be provided to sustain the release of hydrogen gas, (d) the maximum operating temperature of the release of hydrogen gas, and (e) the total volume of hydrogen that can be produced per unit of volume and per unit of mass of the hydrogen containing material(s).

Some hydrogen containing compounds can be heated to release hydrogen gas, such as in a chemical decomposition reaction. Reactants that can undergo thermal decomposition reactions to produce hydrogen gas are desirable because they generally produce a relatively high volume of hydrogen gas on a volumetric basis.

One problem with conventional hydrogen generators is that heat transfer from the heating element to the fuel is inefficient. Another problem with conventional hydrogen generators is difficulty in loading fuel units and un-loading or replacing spent fuel units.

SUMMARY

In one aspect of the invention, one or more temperature sensitive actuators coupled to one or more heating elements are used to improve the transfer of thermal energy from heating element(s) to one or more fuel units. In one embodiment, an actuator allows insertion and/or removal of packaged fuel units without the need of removing the heating element(s) and/or the actuator(s). When the actuator is in a retracted (low temperature) state, the packaged fuel unit may be inserted and removed from a cavity of a hydrogen generator, as discussed below. When the actuator is in an extended (high temperature) state, the actuator forces contact between itself or the heating element and a fuel unit when a prescribed operating temperature is reached.

In one aspect of the invention, there is provided a hydrogen gas generator including a housing including a plurality of sidewalls and a rear wall, wherein the plurality of sidewalls and rear wall form a cavity configured to receive one or more fuel units; and a heater assembly configured to be at least partially housed within the cavity, the heater assembly including a support member configured to support at least one heating element and at least one actuator. The at least one actuator is in a first state when a temperature of the at least one actuator is below a first prescribed temperature, and the at least one actuator is in a second state when a temperature of the at least one actuator is above a second prescribed temperature that is equal to or higher than the first prescribed temperature. At least one of the at least one heating element and the at least one actuator is displaced closer in proximity to the one or more fuel units when the at least one actuator is in the second state than when the at least one actuator is in the first state. Embodiments may include one or more of the following features:
  in the second state the at least one heating element is in conductive thermal communication with at least a portion of the one or more fuel units;
  in the second state the at least one actuator is in contact with at least a portion of the one or more fuel units;
  in the second state the at least one heating element is in contact with at least a portion of the one or more fuel units;
  the heater assembly is mounted to at least one sidewall of the housing;
  the heater assembly is mounted to the rear wall of the housing; the heater assembly may be centrally mounted to the rear wall of the housing, such that fuel units may be loaded or unloaded without removing the heater assembly from the housing;
  the hydrogen generator further includes a front panel configured to engage the plurality of sidewalls in order to close the housing; the heater assembly can be coupled to the front panel and extend from an interior side of the front panel into the cavity; when the actuator is in the second state, the front panel may be more difficult to disengage from the plurality of sidewalls than when the at least one actuator is in the first state.

the heater assembly extends between two or more of the fuel units;

the heater assembly is symmetrical along a cross-sectional plane of the cavity;

at least one of the prescribed temperatures is 250 degrees Celsius; the first prescribed temperature may be 200 degrees Celsius and the second prescribed temperature may be 250 degrees Celsius.

In another aspect of the invention, there is provided a hydrogen gas generator including a housing including a plurality of sidewalls and a rear wall, wherein the plurality of sidewalls and the rear wall form a cavity configured to receive one or more fuel units; and a heater assembly including a support member configured to support at least one heating element and at least one actuator. The at least one actuator is in a first state when a temperature of the at least one actuator is below a first prescribed temperature, and the at least one actuator is in a second state when a temperature of the at least one actuator is above a second prescribed temperature that is equal to or higher than the first prescribed temperature. At least one of the at least one actuator and the at least one heating element is disposed closer in proximity to the one or more fuel units when the at least one actuator is in the second state than when the at least one actuator is in the first state. Embodiments may include one or more of the following features:

in the second state the at least one heating element is in conductive thermal communication with at least a portion of the one or more fuel units;

in the second state the at least one heating element is in contact with at least a portion of the one or more fuel units;

in the second state, the at least one actuator is in contact with at least a portion of the one or more fuel units;

the heater assembly is mounted to at least one sidewall of the housing;

the heater assembly is mounted to the rear wall of the housing; the heater assembly may be centrally mounted to the rear wall of the housing, such that fuel units may be loaded or unloaded without removing the heater assembly from the housing;

the hydrogen generator further includes a front panel configured to engage the plurality of sidewalls in order to close the housing; the heater assembly can be coupled to the front panel and extend from an interior side of the front panel into the cavity; when the actuator is in the second state, the front panel may be more difficult to disengage from the plurality of sidewalls than when the actuator is in the first state.

the heater assembly extends between two or more of the fuel units;

the heater assembly is symmetrical along a cross-sectional plane of the cavity;

at least one of the prescribed temperatures is 250 degrees Celsius; the first prescribed temperature may be 200 degrees Celsius and the second prescribed temperature may be 250 degrees Celsius.

In another aspect of the invention there is provided a method for heating a fuel unit provided in hydrogen generator, the method comprising: receiving one or more fuel units in a cavity of a housing, wherein the housing includes a plurality of sidewalls and a rear wall, and the plurality of sidewalls and rear wall form the cavity configured to receive the one or more fuel units; heating at least one temperature-sensitive actuator above a prescribed temperature, wherein the at least one actuator is in a first state when a temperature of the at least one actuator is below a first prescribed temperature, and the at least one actuator is in a second state when a temperature of the at least one actuator is above a second prescribed temperature that is equal to or higher than the first prescribed temperature, and wherein the least one actuator is disposed closer to the one or more fuel units in the second state than in the first state; disposing the at least one actuator in contact with the at least one heating element; and contacting one of the at least one an actuator and the at least one heating element to the one or more fuel units for selectively heating the one or more fuel units. Embodiments may include one or more of the following features:

the at least one actuator is operative to move between the first state and the second state upon reaching one of the first and second prescribed temperatures; the at least one actuator may momentarily snap between first state and the second state upon reaching one of the pre-scribed temperatures;

the actuator is a bimetallic element;

at least one of the first and second prescribed temperatures is 250 degrees Celsius; the first prescribed temperature may be 200 degrees Celsius and the second prescribed temperature may be 250 degrees Celsius.

DETAILED DESCRIPTION

Figure 1:
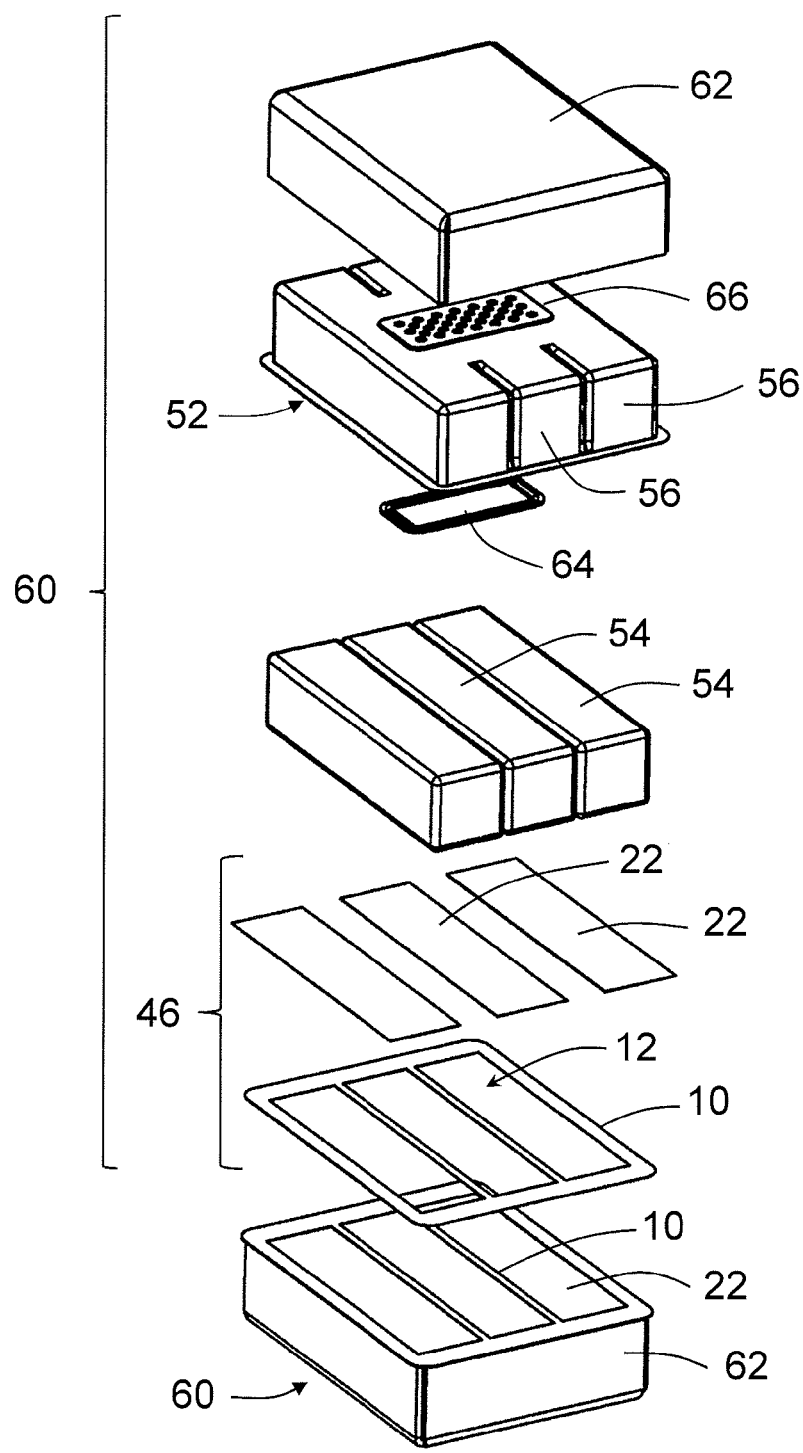
FIG. 1 is a partially exploded perspective view of two fuel unit packages.

The above aspects are accomplished by a hydrogen gas generator having a cavity formed within a housing of the generator and a heater assembly within a cavity. The heater assembly includes a support member configured to support at least one heating element and at least one actuator. The actuator is in a first state when a temperature of the actuator is below a first prescribed temperature and the actuator is in a second state when a temperature of the actuator is above a second prescribed temperature. The heating element or the actuator is disposed closer in proximity to one or more fuel units contained within the cavity when the actuator is in the second state than when the actuator is in the first state.

The actuator allows slip fit of packaged fuel over a heating element for each operator installation when the actuator is in a retracted position (i.e., a first state) and forces contact between the fuel unit and at least one of the heating element and the actuator with the fuel unit when the actuator is in an extended position (i.e., a second state). The hydrogen gas generator is particularly well suited for receiving a fuel unit package. With the actuator is the retracted position, damage to the actuator, heating element and fuel unit can be avoided during insertion and removal of the fuel unit. Any fuel unit package may be used in accordance with aspects of the present invention.

The packaged fuel unit can be removably inserted into a hydrogen gas generator that can be used to provide hydrogen gas to a device, such as a fuel cell battery or other hydrogen consuming device or appliance. The fuel unit contains a fuel composition enclosed within the package. The fuel composition includes one or more hydrogen containing materials that can release hydrogen gas when heated to at least a minimum temperature. Heat from outside the fuel unit is conducted through the package to initiate the release of hydrogen gas from the fuel composition, as described below. For example, heat can be conducted from one or more external heating elements (outside the fuel unit), either directly from the heating elements or indirectly (through the actuator(s)) via one or more thermal conductor sections in the package. An example of a suitable fuel unit package and a method of making it is disclosed in U.S. Provisional Application No. 61/657,909, entitled "Method of Making a Packaged Fuel Unit for a Hydrogen Generator, filed Jun. 11, 2012. This package includes a plurality of thermally conductive sections in a package wall that is otherwise a relatively poor thermal conductor. The thermal conductor sections are in thermal communication with a plurality of segregated quantities of fuel composition, such that the release of hydrogen gas can be selectively initiated in individual segregated quantities, each providing a limited amount of hydrogen gas.

In the assembled fuel unit, the conductor sections in the package are disposed to conduct heat from an external heating element through the package. Each conductor section can conduct heat from a separate heating element through the package, or heat from more than one heating element can be conducted through a single conductor section.

The fuel unit fuel composition includes one or more hydrogen containing materials that can release hydrogen gas when heated. In order to economically produce a large volume of hydrogen gas per unit of volume and weight, it is advantageous to use a material that can release hydrogen gas when heated. Such materials can produce a larger volume of gas of reactant than, for example, the same amount (per mole, per unit of weight or per unit of volume) of reactants that undergo a hydrolysis reaction. Preferred materials do not require costly catalysts to undergo hydrogen-generating reactions.

The fuel composition contains at least one hydrogen containing material. More than one hydrogen containing material can be included. Examples include materials that can reversibly absorb and desorb hydrogen (e.g., metal-organic frameworks (MOFs), zeolites, graphene, carbon nanotubes and metal hydrides as $AB_5$ and $AB_2$ type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane), and various combinations including the above materials. Choices of materials may be limited by other factors such as physical and chemical properties of the material, the type and location of heating elements, the temperature range for the desired release of hydrogen gas, whether the hydrogen release is exothermic or endothermic, the composition, form and properties of byproducts, and so on.

The fuel composition can also contain one or more additives. Examples of additives include binders (e.g., acrylates and styrene block copolymers), stabilizing compounds (e.g., solid bases), thermally conductive materials (e.g., metals, graphites and combinations and composites thereof), ignition materials as described below, thermally conductive coatings or layers, thermally insulating coatings or layers, and so on. Preferably catalysts are not included in the fuel composition.

It may be desirable to include an ignition material in the fuel unit, especially if the release of hydrogen gas is endothermic. An ignition material reacts exothermically when heated and can be used in conjunction with the initiation system to provide heat to initiate the release of hydrogen gas from the hydrogen containing material. An ignition material can provide a number of advantages. The temperature to which the ignition material must be heated to react may be lower than the minimum temperature to which the hydrogen containing material must be heated, reducing the heat producing requirement for the initiation system. Because the ignition material reacts exothermically, it can reduce the total amount of energy that must be supplied to the heating elements during use of the fuel unit, particularly if the release of hydrogen gas by the hydrogen containing material is endothermic. An ignition material can be disposed within or in contact with the fuel composition. For example, the ignition material can be an ingredient of the fuel composition, the ignition material can be a separate layer of the fuel composition from the portion containing the hydrogen containing material, or ignition material can be in a separate pellet in thermal communication with the fuel composition. When an ignition material is separate from the hydrogen containing material, portions containing ignition material can be alternated with portions containing hydrogen containing material. For example, each portion containing hydrogen containing material can have an adjacent portion of ignition material; a portion containing ignition material can be disposed adjacent to multiple portions of fuel composition. If desired, ignition material can be proximate a surface of the fuel unit to facilitate initiation by an external heating element. A portion of ignition material can extend away from the point of initiation to facilitate heating fuel composition in remote portions of the fuel unit. In some embodiments, both the portion containing hydrogen containing material and the portion containing ignition material contain both hydrogen containing and ignition materials, but in different proportions. Some types of ignition materials will also generate hydrogen gas when they react, contributing to the total amount of hydrogen the fuel unit can provide.

Examples of ignition materials include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly (acrylamide-co-acrylic acid) alone or in combination with sodium borohydride (Varma, et al. *Chem. Eng. Sci* 2010, 65, 80-87 and *Int. J. Hydrogen En* 2007, 32, 207-211, respectively). It will be understood that references herein to initiating a release of hydrogen gas from a hydrogen containing material includes initiating a heat generating reaction in an ignition material in embodiments in which the fuel unit includes an ignition material.

The fuel composition is preferably a high density solid, rather than a gas, liquid or gel. A solid fuel composition can be in any suitable form, such as in powdered or granular form (e.g., contained in one or more compartments), or formed into solid bodies such as pellets, pills, tablets, wafers or cakes, e.g., by compressing, molding extruding depositing, coating roll coating, printing, and so on. The fuel composition can be in contained within one or more receptacles or formed on a substrate. Each fuel unit can have a single quantity of fuel composition, or the fuel composition can be disposed in one or more segregated quantities. Quantities of fuel composition can be sized and shaped to produce a desired amount of hydrogen gas, fit within the fuel unit in a volume efficient manner, facilitate initiation (heating), prevent cross-initiation of adjacent quantities, facilitate release of generated hydrogen, and so on.

Segregated quantities of fuel composition can be separated from one another in various ways, such as by containment in individual compartments and/or being spaced apart by gaps, coatings, thermal insulation and the like. If the fuel composition is contained in one or more compartments, the compartments may be covered with a covering layer to retain the material in the desired compartments. The compartments and the covers can be part of the fuel unit package.

The fuel unit package contains the fuel composition as well as non-gaseous byproducts. The package will have sufficient strength and chemical and thermal stability to do so during shipping, during storage and handling prior to use, during use, and during removal and subsequent handling. The package can be made from a variety of materials, such as metal foil, polymer film, laminates such as metal/plastic laminates, and cast or molded casings. Examples of metal/plastic laminates include metals such as aluminum, nickel, copper and steel and polymers such as polyesters, nylons, polypropylene and polyethylene. High temperature plastics and thermosets can be used to cast or mold casings; examples include polyimides such as KAPTON® (from DuPont) and polyether ether ketone (PEEK) polymers. The package can be closed by any suitable method or methods, such as by folding and/or overlapping, mechanically closing, sealing (e.g., with an adhesive, heat seal, ultrasonics) and so on. It may also be desirable for the package to remain sealed except to release hydrogen as needed. This can require sealing the package, the use of a hydrogen outlet valve and/or the capability of containing at least some internal pressure for example. Sealing the package can protect the contents from exposure to the environment (e.g., from oxygen and moisture), contain small quantities of hydrogen that may be produced before the fuel unit is used and facilitate removal of contaminants from the hydrogen gas before it is released from the fuel unit.

It may be desirable to include thermal insulation near or as part of the package to protect the user when a used fuel unit is removed from the hydrogen generator. The package itself may be or include (e.g., as a layer thereof) a poor thermal conductor, or a layer of thermal insulation can be provided external or internal to the package. Examples of materials that may be suitable as thermal insulation include silica, silicon dioxide, silicon nitrides, silicon carbide, silica aerogel, calcium silicate, foamed silicone, alumina, aluminum oxide, glass, glass wool, mineral wool, cellular glass, perlite, and elastomers and polymers such as polyimides and epoxy-amine composites.

It may be desirable to include thermal conductors within the fuel unit to provide good heat transfer to remote portions of the fuel composition (portions that are not close to the package or to the heaters). As described above, additives may be included in the fuel composition for this purpose, or thermally conductive components can be included within the fuel unit. Heating efficiency can also be enhanced by applying heat to a recessed portion of the fuel unit package, such as a hollow core of the fuel unit, rather than to an outer surface (e.g., an outside diameter) of the fuel unit because heating from the inside of the fuel unit will result in less parasitic heat loss than heating from the outside of the fuel unit. A similar effect can be accomplished by locating internal heaters away from the outer surface of the fuel unit.

Fuel units can be used in a hydrogen generator in which the fuel composition in a fuel unit is heated to produce hydrogen gas. The hydrogen gas can be used by a hydrogen consuming apparatus, such as a hydrogen fuel cell battery. The hydrogen generator can be made by providing and assembling: a housing with one or more cavities for removably containing one or more fuel units, one or more heating elements, each configured to heat a portion of the fuel composition in the fuel unit(s) to at least a minimum temperature, an energy source, electric circuitry for supplying electric current to the heating element(s), and one or more fuel units, which are removably inserted into the one or more cavities. As described in more detail below, the one or more heating elements may be coupled to one or more actuators in order to place the heating element or the actuator in direct contact with the fuel units. Preferably, the one or more actuators are temperature-sensitive.

Preferably the hydrogen generator is portable, either alone or as part of a hydrogen consuming apparatus, such as part of a fuel cell system including a fuel cell battery or contained within a portable device that can be powered by a fuel cell system. As used herein, portable means readily moved by an individual person, without requiring the use of lifting or transporting equipment (e.g., a hoist, dolly, lift truck or the like).

In order to provide an economical hydrogen generator, it is desirable to be able to replace spent fuel composition (e.g., reaction byproducts) with fresh fuel composition, rather than replacing the entire hydrogen generator. This allows durable components of the hydrogen generator to be used many times. To maximize this effect, it is desirable to incorporate as many reusable components as practical into the reusable portion of the hydrogen generator (referred to below as the holder), the rest of the fuel cell system and/or the device associated with the fuel cell system, and to limit the number of components in the replaceable portion of the hydrogen generator (referred to below as the fuel unit) to the greatest extent practical. This is particularly true for such items that occupy a relatively large volume and/or are relatively expensive. Ideally, fuel units would contain only the hydrogen containing materials and minimal packaging. However, for practical reasons it may also be desirable to include other ingredients and components in the fuel units.

The hydrogen generator can include a holder that is configured to receive one or more fuel units. It can contain at least some of the other components of the hydrogen generator. In some circumstances, it may be desirable to locate at least portions of other components outside the holder, such as elsewhere within the fuel cell system and/or device. The holder can include a housing of its own, particularly if the holder is intended to be removed from or used while outside the rest of the fuel cell system or device. A separate holder housing may not be desired if the hydrogen generator is contained within the fuel cell system and/or device. For example, a portion of the fuel cell system or device can serve as all or part of a holder housing. The holder housing has sufficient mechanical strength and resistance to the environment to which the hydrogen generator is expected to be exposed, particularly to high temperatures and hydrogen containing materials and byproducts associated with the release of hydrogen gas. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethylenglycol anhydride (Bakelite®), epoxies, phenolics, diallyl phthalate and melamine may be suitable for the housing. In some embodiments the holder may be made from a material that is a poor thermal conductor (e.g., less than 10 watts/meter·Kelvin), and preferably less than 1 watt/meter·Kelvin) to protect the rest of the fuel cell system, the device and/or the user from heat produced within the hydrogen generator. If desired, thermal insulation can be added to the hydrogen generator, within the housing, around the housing or elsewhere in the fuel cell system or the device. A vacuum, such as in a hollow space in a wall(s) of the holder, can provide thermal insulation. Thermal insulation can protect components of the hydrogen generator, other parts of the fuel cell system, the device with which the fuel cell system is being used, and/or the user.

The hydrogen generator includes one or more cavities into which one or more fuel units can be removably inserted. The hydrogen generator can include features for aligning the packaged fuel unit in a particular orientation, providing thermal and/or electrical contact with the fuel unit, and/or providing a hydrogen gas flow path between the holder and the fuel unit. For example, walls defining the cavity can include one or more projections that cooperate with features of the fuel unit to permit insertion of a fuel unit into the cavity in only the desired orientation, projections can provide electrical and/or thermal contact with the fuel unit, or one or more projections can extend into a recessed area of the fuel unit to provide heating from the inside of the fuel unit outward. The hydrogen generator can be closable to retain the fuel unit within the cavity, and it may be sealable to exclude gases from the outside environment and to contain pressurized hydrogen gas. If internal pressure can build up during operation of the hydrogen generator, it may be desirable to include a pressure relief vent to release gas before the pressure becomes excessive (i.e., to prevent undesired opening or bursting of the housing).

Hydrogen gas produced in the fuel unit exits the fuel unit and then exits the hydrogen generator through a hydrogen flow path to an outlet that interfaces with the rest of the hydrogen consumint (e.g., fuel cell) system. The hydrogen generator can include various fittings, valves and electrical connections for providing hydrogen to and interfacing with a fuel cell battery and/or an electrical device being provided with power by the fuel cell system. It may be desirable to provide one or more filters or purification units (referred to as filters below) in the hydrogen flow path to remove solid or gaseous byproducts (such as fuel cell poisons) and/or unreacted fuel composition from the hydrogen gas. Filters can be located within the fuel units, within the holder and/or at the interface between the hydrogen generator and the rest of the fuel cell system. Filters within the fuel units are replaced when the fuel units are replaced. It may be desirable to provide access for periodically replacing filters located outside the fuel units. Examples of materials that may be suitable for filters include silica, silicon dioxide, silicon nitrides, silicon carbide, silica aerogel, alumina, aluminum oxide, glass, glass wool, mineral wool, cellular glass, microfiberglass, perlite and polymers such as polytetrafluoroethylenes, polyimides and epoxy-amine composites, as well as suitable gas purification units (such as ion exchange resins). It may be possible to position filters so they also provide thermal insulation.

The hydrogen generator includes one or more heating elements for converting electric energy to thermal energy that can provide heat for releasing hydrogen gas from the hydrogen containing material in the fuel unit. Examples of suitable energy sources include one or a combination of a primary battery, a secondary battery, a fuel cell battery, a capacitor and a public utility. The energy source is preferable outside the fuel unit, such as in the holder, elsewhere in the fuel cell system, in the device, or external to the device. Circuitry in the hydrogen generator and/or the fuel unit can carry the electric energy to the heating element(s) and/or the actuator(s). The heating elements are outside the fuel unit (e.g., in the holder), where they can be reused. The heating element can be a resistive heater. Any suitable resistive heater can be used, such as a resistive heater including metals or alloys such nickel-chromium, iron-chromium-aluminum and copper-nickel. Another exemplary heating element includes a thin profile mica heater, as discussed below. An external heater heating element will be in thermal contact with a thermally conductive sections in the fuel unit package such that heat produced by the heating element is conducted through the package to the contents of the fuel unit. To provide good thermal contact, the fuel unit package can fit snugly against the heater or an intermediate thermal conductor, such as an actuator. The heater or intermediate thermal conductor can be biased against the conductor section. This can be accomplished by configuring the heating element as a biasing member and/or by placing an intermediate biasing member that is a good thermal conductor in thermal contact between the heating element and the fuel unit package conductor section through the actuator. The use of a biasing member can provide good thermal contact between the heating element and the fuel unit without impeding insertion or removal of the fuel unit into and from the cavity and can compensate for expansion or contraction of the fuel unit during use.

As described in further detail below, multiple heating elements can be used to provide the capability of selectively heating limited quantities of the total amount of hydrogen containing material in one or more fuel units. This can be helpful in generating hydrogen gas on an as needed basis and minimizing response times during intermittent use, without creating excessive pressure within the hydrogen generator.

For example, individual heating elements can be associated with segregated quantities of fuel composition within a fuel unit, and operation of selected heating elements can be controlled to initiate the release of hydrogen gas within only the desired quantities of fuel composition. This can require alignment of conductor sections in the fuel unit package with individual heating elements or electrical contact terminals in the hydrogen generator outside the fuel unit. As an alternative, a heating element can be moved within the cavity to align with selected conductor sections of the fuel unit package. This can provide controlled generation of hydrogen gas with fewer heating elements, but adding volume and cost for the mechanism necessary to move the heating element.

It has been discovered that the closer the heating element or a thermally conductive element is to the fuel unit, the more efficient thermal conduction will be. Testing has revealed that heat transfer from the heating element to the fuel unit is not efficient when heating element to fuel unit contact is poor (e.g., the larger the space between the heating element and the fuel unit, the more inefficient thermal conduction becomes). Efficiency of heating the fuel unit reduces parasitic losses, which will allow the packaged fuel to be smaller and less expensive, for example.

In order to improve thermal efficiency, an actuator is provided that effectively moves the heating element closer to the fuel unit or enables conductive thermal communication between the heating element and the fuel unit. The conductive thermal communication provides conduction of heat either directly from the heating element or indirectly from the heating element, through the actuator, to the fuel unit. In this way heat is efficiently delivered to the fuel unit. The actuator may be any desired actuator. Preferably, the actuator allows insertion and removal of the one or more fuel units into and from the cavity (or cavities) without removal of the heating element(s) or the actuator. In addition, it also desirable that the actuator be thermally activated.

The actuator may go through a transition between the first and second states, in which the actuator and/or the heating element is neither fully retracted nor fully expanded, with the actuator being in a transitional state when its temperature is between the first and second prescribed temperatures, or the change between first and second states can be essentially immediate (i.e., no more than about 5 seconds), with the first and second prescribed temperatures being essentially equal. In some embodiments the change from the first state to the second state can be at temperature that is higher than the temperature at which the change from the second state to the first state occurs, whether the actuator goes through a transitional state or not.

In one embodiment, the actuator immediately changes from the first state to the second state or from the second state to the first state upon a prescribed temperature being reached. Such action may be referred as "snap action", where the actuator is stable only in the first state or the second state, and the time between reaching the first state and second state is no more than about 5 seconds. For example, the actuator may change from the first state to the second state when actuator temperature reaches 250 degrees Celsius. The actuator may change from the second state to the first state when the actuator temperature reaches 200 degrees Celsius.

An exemplary actuator is a bimetallic element. A bimetallic element is a device formed of two metals that are bonded together, each having a different coefficient of thermal expansion. A bimetallic element is used to convert a temperature change into mechanical displacement. In particular, the actuator is in a first (retracted) state when a temperature of the actuator is below a first prescribed temperature and the actuator is in a second (extended) state when a temperature of the actuator is above a second prescribed temperature. Such an actuator provides an efficient and reliable means of transferring thermal energy from the heating element to the fuel unit. The bimetallic elements may take any desired form. For example, the bimetallic elements may include one or more discs or Z-folded elements. The size and shape of the bimetallic materials may vary based on the application, the fuel unit and/or the heating element.

Another exemplary actuator is a layer of plaque made up of from a positive temperature coefficient (PTC) composition that includes a carbon and polymer blend, may be used to join the heating elements to the fuel unit. The PTC composition expands during heating. The layer of plaque is used to join the heating elements to the conductor sections when the fuel are inserted in the cavity and the layer of plaque is heated to a temperature sufficient to activate the PTC composition.

The heater assembly is configured to be at least partially housed within the cavity. The heater assembly includes a support member configured to support at least one heating element and at least one actuator. The actuator is in a first state when a temperature of the actuator is below a first prescribed temperature and the actuator is in a second state when a temperature of the actuator is above a second prescribed temperature. At least one of the heating element and the actuator is disposed closer in proximity to the fuel units when the actuator is in the second state than when the actuator is in the first state. Thus, the actuator may be used to place the heating element in direct contact with the fuel unit, or the actuator, which is thermally conductive, may be between the heating element and the fuel unit, in direct contact with both, so that it is able to conduct heat from the heating element to the fuel unit.

One advantage of using the actuator described above is that in the first state, when the actuator temperature is below a first prescribed temperature, the actuator is in a retracted state. Such a state enables an user to easily remove and/or replace spent fuel units, as well as insert new fuel units, without removing components of the hydrogen generator (e.g., the heating elements).

The mounting of the heater assembly to the hydrogen generator may take a variety of forms. For example, the heater assembly may be secured to a structure of the housing. The heater assembly may be secured to the rear wall of the one or more cavities, one or more sidewalls of the one or more cavities and/or to a front panel, which effectively seals the cavity and provides access for a user to insert and/or remove fuel units. Preferably, the heater assembly is configured for permanent positioning within the cavity. The heater assembly may also include a fastening mechanism that enables the heater assembly to be removed, at times, for maintenance, for example. The heater assembly may use any desired fastening mechanism to secure the heater assembly to the housing.

In one embodiment, the actuator is configured to be secured to a structure within the cavity. As described above, such a structure may include: a rear wall, a sidewall, and/or a front panel of the housing. Any number of actuators may be used in conjunction with a particular fuel unit. In one embodiment, a single actuator element is coupled between the structure of the cavity and the heating element. In another embodiment, a plurality of actuators are coupled between the structure of the cavity and the heating element.

In yet another embodiment, a single actuator element may be coupled between the structure of the cavity and a plurality of heating elements. In another embodiment, the number of actuators is the same as the number of conductive regions on the packaged fuel unit.

In another embodiment, the one or more heater elements are configured to be secured to a structure within the cavity. As described above, such a structure may include: a rear wall, a sidewall, and/or a front panel of the housing. Any number of heater elements may be used in conjunction with a fuel unit. In one embodiment, a single heater element is coupled between the structure of the cavity and the actuator. In another embodiment, a plurality of heating elements are coupled between the structure of the cavity and the actuator. In yet another embodiment, a single heating element may be coupled between the structure of the cavity and a plurality of actuators. In another embodiment, the number of actuators is the same as the number of conductive regions on the packaged fuel unit.

In another embodiment, the heater assembly is coupled to the front panel and extends from the interior side of the front panel into the cavity. The heating elements and the actuator may be secured on the both sides of the heater assembly or on a single side of the heater assembly. The heating element may be secured between the heater assembly and the actuator or the actuator may be secured between the heater assembly and the heating element. In such an embodiment, it is preferable for the heater assembly to be inserted between a plurality of fuel units.

The structures set forth above are robust and provide a convenient mechanism for loading and/or removing fuel units from the cavity in a wide range of applications. This is accomplished by the dual state nature of the actuator. For example, when a temperature of the actuator is below a first prescribed temperature the actuator in a first state (e.g., a retracted state) and the actuator is in a second state (e.g., an extended state) when a temperature of the actuator is above a second prescribed temperature. In the first state, one or both the heating element and the actuator are disposed farther from the fuel unit than when the actuator is in the second state, leaving a gap between the fuel unit and the heating element and actuator. In the second state, the heating element or the actuator is in direct and thermal contact with the fuel unit.

In order to provide hydrogen gas on an as-needed basis without developing a high internal pressure within the hydrogen generator, it may be advantageous for the hydrogen generator to include multiple fuel units, each of which that can be used selectively, and/or for the fuel unit(s) to contain multiple segregated quantities of fuel composition in which the release of hydrogen gas can be individually initiated on a selective basis. This can be accomplished by using a control system in conjunction with multiple heating elements and/or a moveable heating element that can be located within or aligned with individual segregated quantities of fuel composition in the fuel unit(s).

A control system can be used to control the supply of energy from a source to the heater assembly. The control system can determine the need for hydrogen and/or the required hydrogen flow rate by monitoring the pressure within the hydrogen consuming (e.g., fuel cell) system, one or more electrical characteristics of the fuel cell battery, or one or more electrical characteristics of the electronic device, for example. The controller may communicate with the device or the fuel cell battery to determine when more hydrogen is needed. The control system can be completely or partially disposed in the hydrogen generator, the fuel cell battery, the electronic device being powered by the fuel cell battery, or any combination thereof. The control system can include a microprocessor or microcontroller; digital, analog and/or hybrid circuitry; solid state and/or electromechanical switching devices; capacitors, sensing instrumentation, timers and so on. The same or a different control system can also be used for other purposes, such as identifying hydrogen generators and fuel units that are appropriate or approved for use, preventing use of inappropriate or unapproved hydrogen generators and fuel units, controlling charging of batteries in the fuel cell system and the device by the fuel cell battery, calculating and providing information on the remaining capacity of the fuel unit(s), recording historical information regarding the use of fuel units, the hydrogen generator, the fuel cell system and the device, preventing operation of the hydrogen generator under unsafe conditions, and other purposes.

In an embodiment of a hydrogen generator, an access panel can be secured to the housing to enclose the fuel unit(s) in the cavity with an interlock mechanism. The interlock mechanism retains the access panel in place when an internal temperature of the hydrogen generator exceeds a prescribed temperature but allows opening or removal of the access panel when the temperature is at or below the prescribed internal temperature. The interlock mechanism can thus prevent removal of a fuel unit from the hydrogen generator while the fuel unit is hot enough to cause personal injury to a user or damage to materials with which it may subsequently come in contact.

FIG. 1 shows two packaged fuel units 60, one of which is shown exploded so internal components are visible. The fuel units 60 are positioned with packaging strips 46 facing each other. Each packaging strip 46 includes a substrate 10 with apertures 12 covered by conductor sections 22. Each of the fuel units 60 is shown in FIG. 1 with external thermal insulation 62 surrounding all sides except the sides covered by the package strips 46. In some embodiments the fuel units 60 can be connected to each other, such as along one edge. They can be interconnected by one or any combination of their containers 52, package strips 46, external thermal insulation 62, or some other component (not shown). If the fuel units 60 are interconnected, they can be spaced apart, and if the interconnection is at least somewhat rigid, spacing can be maintained between the fuel units 60, such as to accommodate a heater assembly between the fuel units 60. The fuel unit 60 can include a hydrogen gas outlet 66 and a filter 64 between the quantities of fuel composition 54 in a plurality of compartments 56 and an outlet 66 (e.g., by attaching a filter membrane to the outlet 66 or the container 52).

Figure 2A:
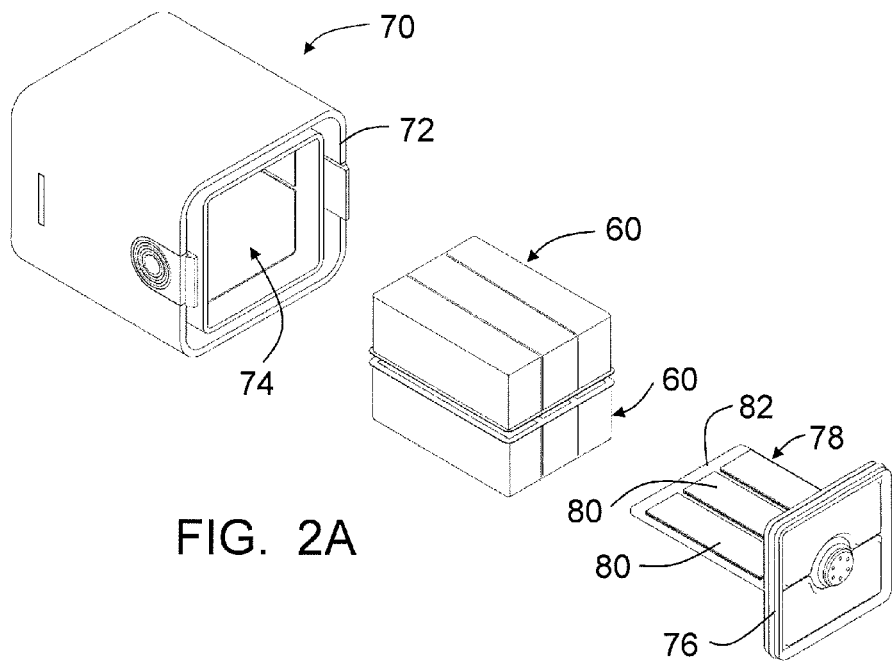
FIG. 2A is a perspective view of an embodiment of a hydrogen generator and fuel units for insertion therein.
Figure 2B:
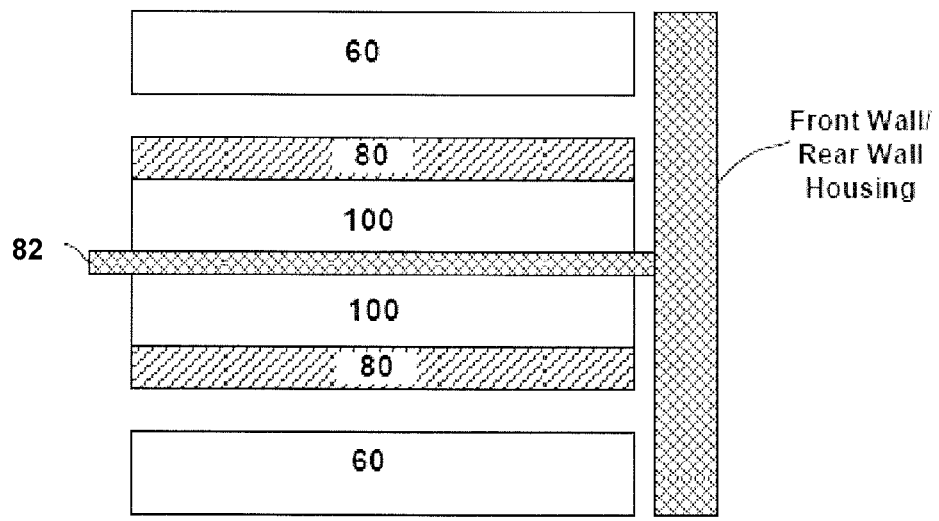
FIGS. 2B and 2C are cross-section views of the embodiment illustrated in FIG. 2A.
Figure 2C:
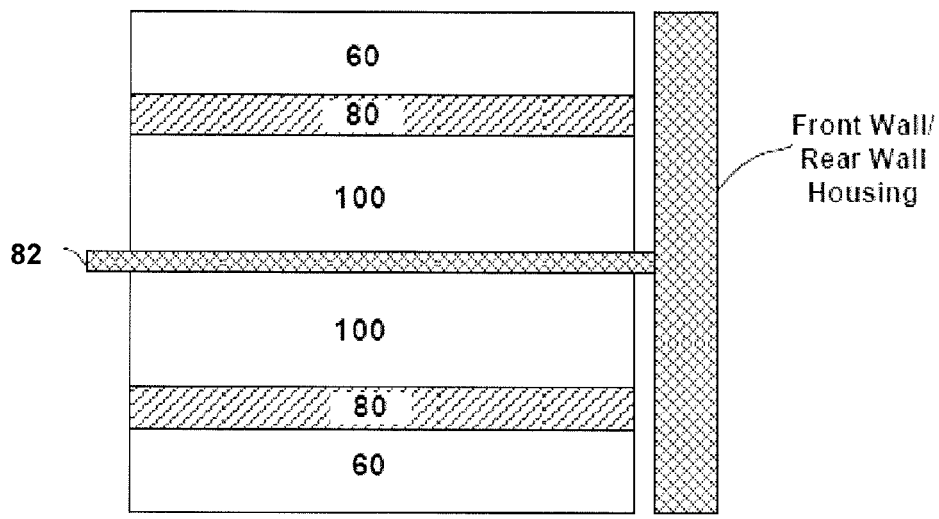

An embodiment of a hydrogen generator is shown in FIGS. 2A-2C. The hydrogen generator 70 includes a housing 72, with a cavity 74 into which packaged fuel units 60 can be inserted. The hydrogen generator 70 includes a door 76 for closing and sealing the housing 72 with the fuel units 60 inside. Two rectangular fuel units 60, each containing three segregated quantities of fuel composition 54 are shown, but fewer or more fuel units with the same or different shapes and the same or a different number of quantities of fuel composition 54 can be used. The hydrogen generator 70 further includes at least one heater assembly 78 with one or more heating elements 80 and actuators 100 (see FIGS. 2B, 2C) supported by a support member 82. The heating elements 80 may be coupled to the support member 82 by one or more actuators 100. The actuators 100 are preferably one or more thermal actuators (e.g., a bimetallic element) that are in a first state when the actuator temperature is below a first prescribed temperature and in a second state when the actuator temperature is above a second prescribed temperature. Referring to FIG. 2B, the actuator 100 is illustrated in the first state. In the first state, the heater assembly 78, along with the heating elements 80 and the actuators 100, is configured to be received between the rectangular fuel units 60. Referring to FIG. 2C, the actuator 100 is illustrated in the second state. In the second state, the actuator temperature is above a second prescribed temperature and the actuator 100 is in an extended state, which forces the heating elements 80 to make contact with the fuel units 60. Preferably, the heating elements 80 will make contact with corresponding conductor sections 22 when the fuel units 60 are disposed in the cavity 74 and the actuators 100 are in the second state.

Figure 3A:
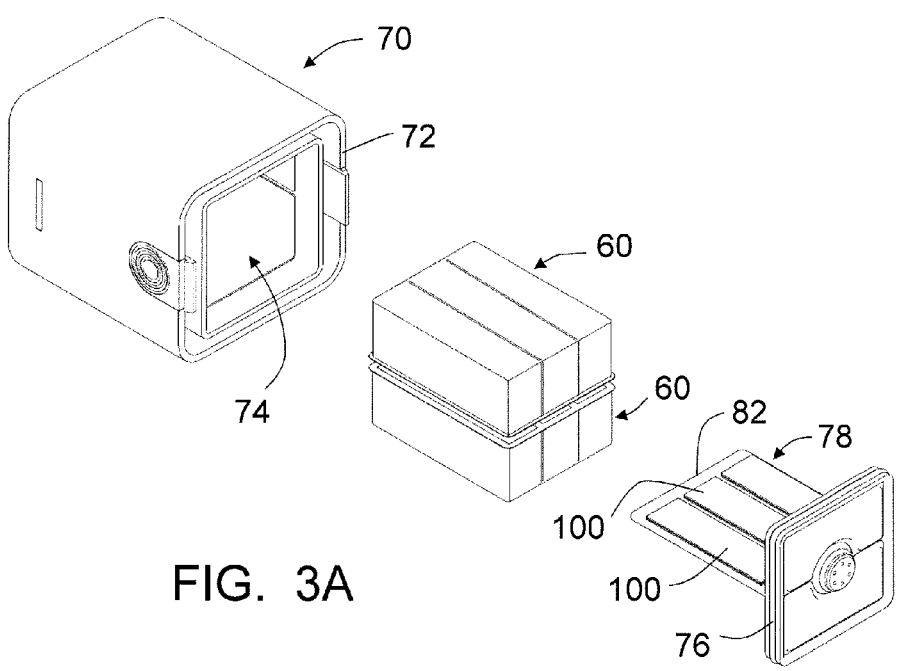
FIG. 3A is a perspective view of an embodiment of a hydrogen generator and fuel units for insertion therein.
Figure 3B:
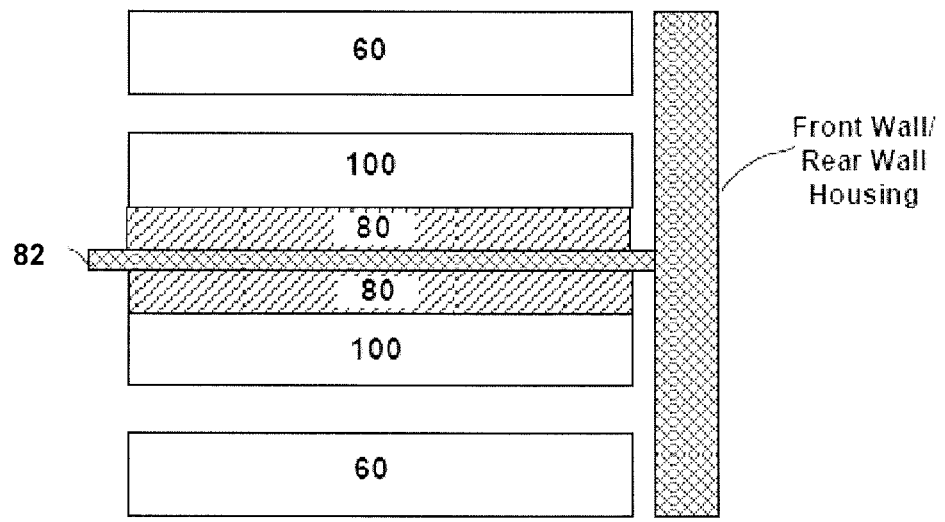
FIGS. 3B and 3C are cross-section views of the embodiment illustrated in FIG. 3A.
Figure 3C:
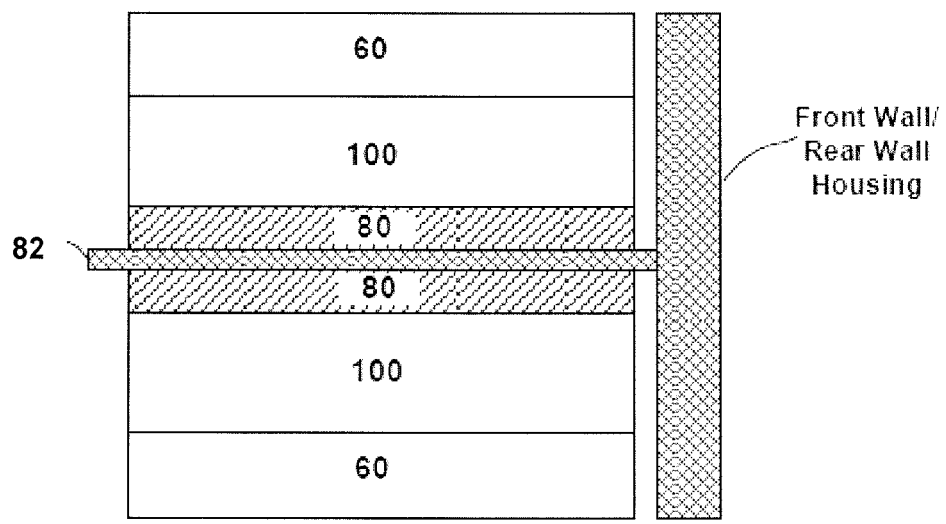

Another embodiment of a hydrogen generator is shown in FIGS. 3A-3C. The hydrogen generator 70 of FIGS. 3A-3C is identical to the hydrogen generator of FIGS. 2A-2C, except that the heating elements 80 are coupled to a support member 82. One or more actuators 100 may then be coupled to the support member 82 as illustrated in FIGS. 3A-3C. Referring to FIG. 3B, the actuators 100 are illustrated in the first state. In the first state, the heater assembly 78, including the heating elements 80 and the actuators 100, is configured to be received between the fuel units 60. Referring to FIG. 3C, the actuator 100 is illustrated in the second state. In the second state, the actuator temperature is above a second prescribed temperature and the actuators 100 are in an extended state. Thermal energy is transferred from the heating elements 80 and through the actuators 100, which are in contact with the fuel unit 60. Preferably, the actuators 100 will make contact with corresponding conductor sections 22 when the fuel units 60 are disposed in the cavity 74 and the actuators 100 are in the second state.

Figure 4A:
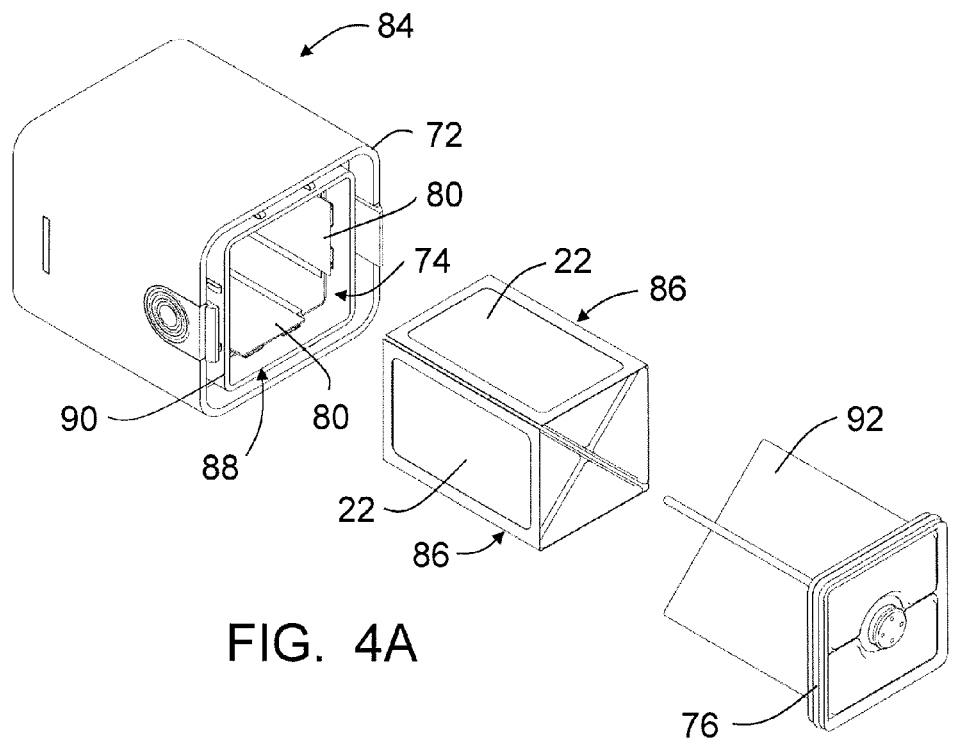
FIG. 4A is a perspective view of an embodiment of a hydrogen generator and fuel units for insertion therein.
Figure 5A:
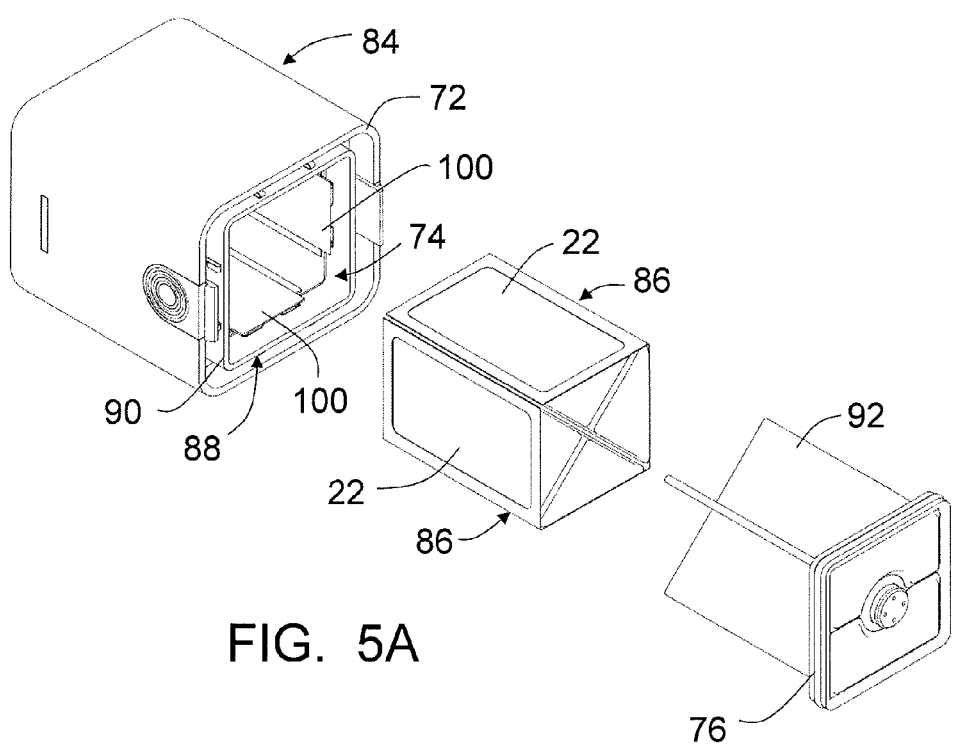
FIG. 5A is a perspective view of an embodiment of a hydrogen generator and fuel units for insertion therein.
Figure 4B:
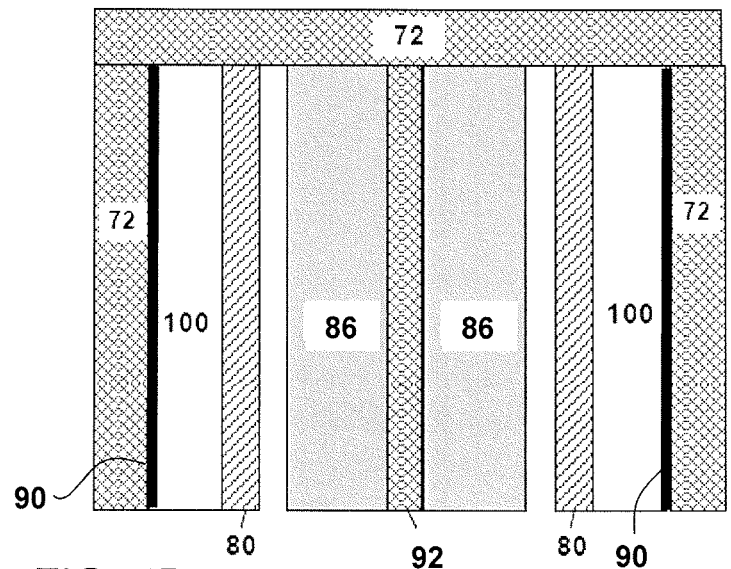
FIGS. 4B and 4C are cross-section views of the embodiment illustrated in FIG. 2A.
Figure 4C:
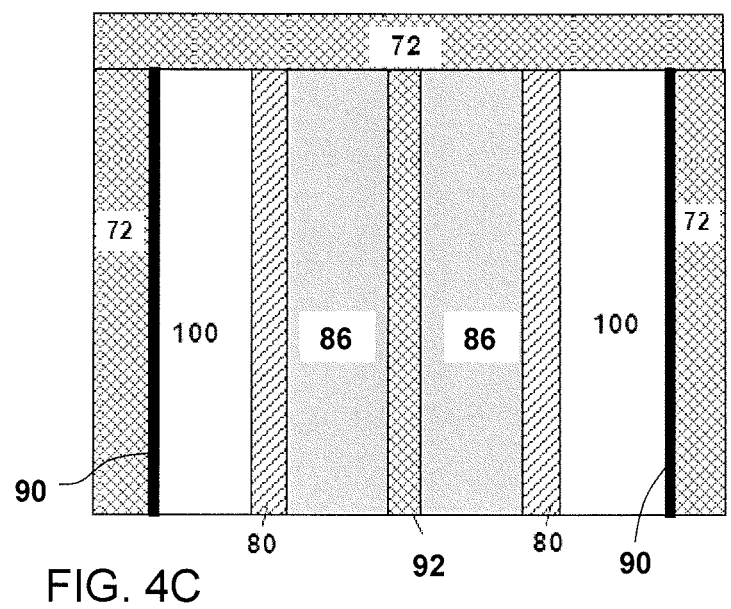
Figure 5B:
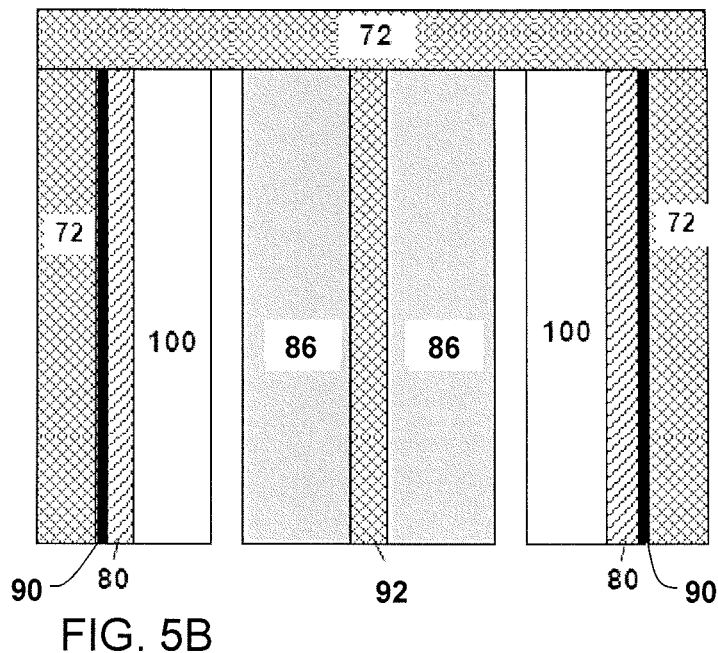
FIGS. 5B and 5C are cross-section views of the embodiment illustrated in FIG. 5A.
Figure 5C:
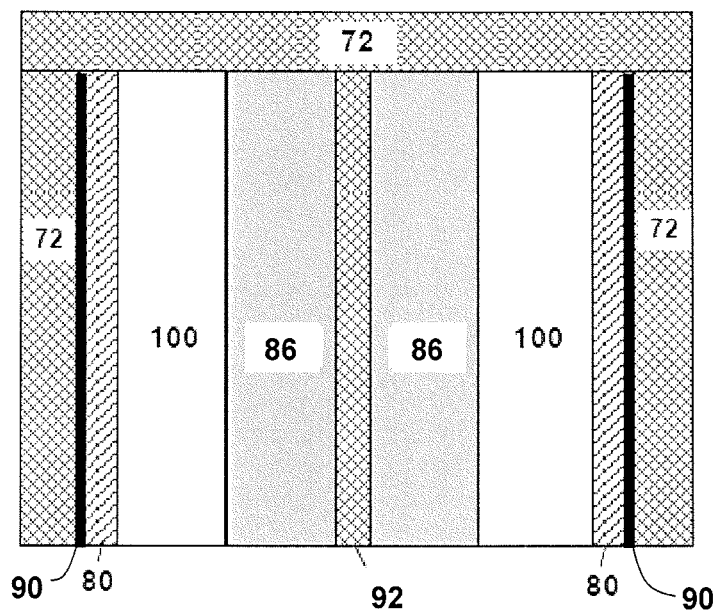

In another embodiment, illustrated in FIGS. 4A and 5A, the heater assembly 88 includes heating elements 80 that can be attached to the housing 72 (e.g., a sidewall, rear wall, etc.) and optionally an intermediate support member 92 through an actuator 100 (as illustrated in FIGS. 4A-4C), or the heater assembly 88 can be attached to the housing 72 and further include an actuator 100 coupled to the support member 92 (as illustrated in FIGS. 5A-5C). When the heater assembly 88 is attached to the side walls or rear wall of the housing 72, as shown in FIGS. 4A and 5A, it may be desirable for support member 92 to be a thermal insulation member, projecting inward from the door 76 to provide thermal separation between the fuel units 86.

Referring to FIGS. 4A-4C, the hydrogen generator 84 further includes at least one heater assembly with one or more heating elements 80 each. The heating elements 80 may be coupled to the support member 90 or housing 72 by one or more actuators 100. The actuator 100 is preferably a thermal actuator (e.g., a bimetallic element) that is operable in a first state when the actuator temperature is below a first prescribed temperature and operable in a second state when the actuator temperature is above a second prescribed temperature. When the actuator temperature is in the first state, the fuel units 86 may be easily inserted and/or removed from the cavity 74. When the hydrogen generator 84 is in the second state and the actuator temperature is above the second prescribed temperature, the actuator 100 is extended and forces the heating element 80 to contact the fuel unit 86.

Referring to FIG. 4B, the actuator(s) 100 are illustrated in the first state. In the first state, the heater assembly 88, including the heating elements 80 and the actuators 100, is configured allow easy insertion and/or removal of the fuel units 86 within the cavity 74. Referring to FIG. 4C, the actuators 100 are illustrated in the second state. In the second state, the actuator temperature is above a prescribed second temperature and the actuators 100 are in an extended state, which forces the heating elements 80 to make contact with the fuel units 86. Preferably, the heating elements 80 will make contact with corresponding conductor sections 22 when the fuel units 86 are disposed in the cavity 74 and the actuators 100 are in the second state.

Another embodiment of a hydrogen generator is shown in FIGS. 5A-5C. The hydrogen generator 84 of FIGS. 5A-5C is identical to the hydrogen generator 84 of FIGS. 4A-4C, except that the heating elements 80 may be coupled to the housing 72 (e.g., a sidewall, rear wall, etc.) or optionally to an intermediate support member 90. One more actuators 100 may be coupled to heating elements 80, such that the one or more actuators 100 can transfer thermal energy emitted by the heating elements 80 to the one or more fuel units 86. The actuators 100 are preferably thermal actuators (e.g., bimetallic elements) that are in a first state when the actuator temperature is below a first prescribed temperature and in a second state when the actuator temperature is above a second prescribed temperature. When the actuator temperature is below the first prescribed temperature, the fuel units 86 may be easily inserted and/or removed from the cavity 74. When the actuator temperature is above the second prescribed temperature, the actuator 100 is extended and makes contact with the fuel unit 86. Preferably, the actuators 100 will make contact with corresponding conductor sections 22 when the fuel units 86 are inserted in the cavity 74 and the actuators 100 are in the second state.

Referring to FIG. 5B, the actuators 100 are illustrated in the first state. In the first state, the heater assembly 88, including the heating elements 80 and the actuators 100, is configured to allow easy insertion and/or removal of the fuel units 86 within the cavity 74. Referring to FIG. 5C, each actuator 100 is illustrated in the second state. In the second state, the actuator temperature is above a second prescribed temperature and the actuator 100 is in an extended state, which forces the actuator 100 to make contact with the fuel unit 86. Preferably, the actuator 100 will make contact with corresponding conductor sections 22 when the fuel unit 86 is disposed in the cavity 74 and the actuator 100 is in the second state.

The heater assemblies 88 can be on an inner surface of the door 76 or an inner surface of the housing 72 (e.g., the side walls and/or rear wall), such that the heating elements 80 or the actuators 100 will make contact with corresponding conductor sections 22 when the fuel units 86 are inserted in the cavity 74 and the actuators 100 are in the second state. Alternatively, the heater assemblies 88 can be on a support member 92 extending from the door 76 (as shown in FIG. 2A) or from the housing 72, such that heating elements 80 or the actuators 100 will make contact with corresponding conductor sections 22 when the fuel unit(s) 86 are inserted in the cavity 74 and the temperature is above the second prescribed threshold. By centrally locating the heater assembly 78, the fuel units 86 are substantially heated from the inside out.

In the embodiments illustrated in FIGS. 4A-4C and 5A-5C, the hydrogen generator 84 includes a housing 72, with a cavity 74 into which packaged fuel units 86 can be inserted. The hydrogen generator 84 includes a door 76 for closing and sealing the housing 72 with the fuel units 86 inside. Four triangular fuel units 86 with one quantity of fuel composition 54 each are shown. Different shapes and numbers of fuel units with different numbers of quantities of fuel composition can be used. As discussed above, the hydrogen generator 84 includes at least one heater assembly 88 with one or more heating elements 80 and one or more actuators 100. The heater assembly 88 can be attached to the door 76, as shown in FIG. 3, or to the housing 72. Heating assemblies 88 can be on an inner surface of the housing 72 (as shown) or door 76, such that the heating elements 80 will make contact with corresponding conductor sections 22 when the fuel units 86 are inserted in the cavity 74. Alternatively, the heater assemblies 88 can be on a support member 82 extending from the door 76 (as shown) or from the housing 72, such that heating elements 80 will make contact with corresponding conductor sections 22 when the fuel units 86 are inserted in the cavity 74.

Figure 6:
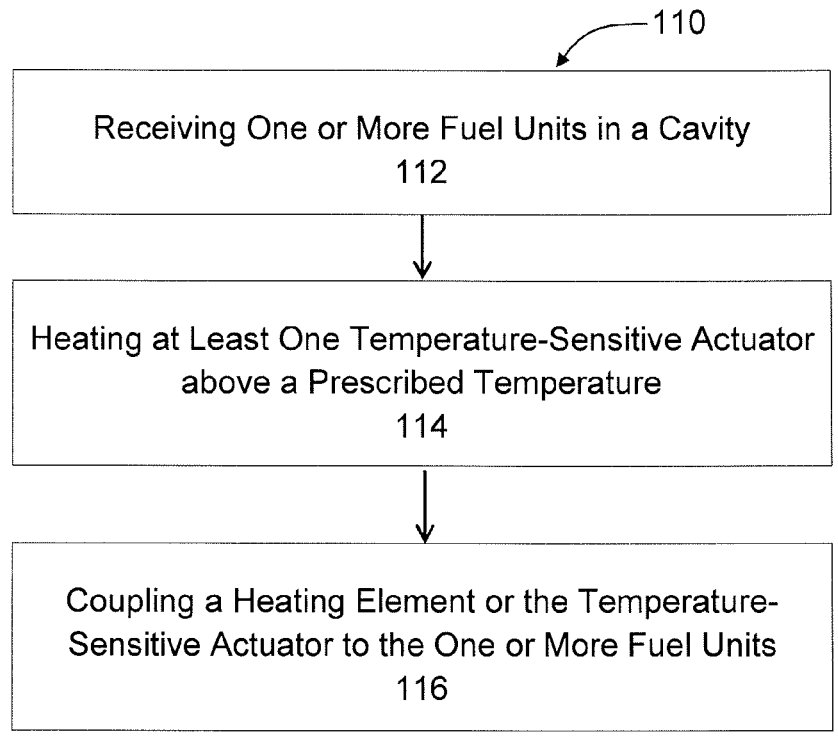
FIG. 6 is an exemplary method in accordance with aspects of the present invention.

An exemplary method 110 for heating a fuel unit provided in a hydrogen generator is illustrated in FIG. 6. At block 112, the method includes receiving one or more fuel units in a cavity of a housing, wherein the housing includes a plurality of sidewalls and a rear wall, and wherein the plurality of sidewalls and rear wall form the cavity configured to receive the one or more fuel units.

At block 114, at least one temperature-sensitive actuator is heated above a prescribed temperature. The actuator is in a first state when an actuator temperature is below a prescribed temperature (e.g., a first prescribed temperature of less than 200 degrees Celsius) and in a second state when an actuator temperature is above a prescribed temperature (e.g., a second prescribed temperature above 250 degrees Celsius), wherein the least one actuator has an extended state in the second state.

At block 116, a heating element coupled to the actuator and/or the temperature-sensitive actuator is coupled to the one or more fuel units for selectively heating the one or more fuel units. The actuator moves between the first state and the second state upon reaching a prescribed temperature (e.g., the second prescribed temperature). The actuator momentarily snaps between first state and the second state upon detecting the prescribed temperature. The actuator can be a bimetallic element. The bimetallic element extends in a first direction and a second opposing direction, illustrated in FIGS. 2B, 2C, 3B, 3C, 4B, 4C, 5B and 5C.

Figure 7A:
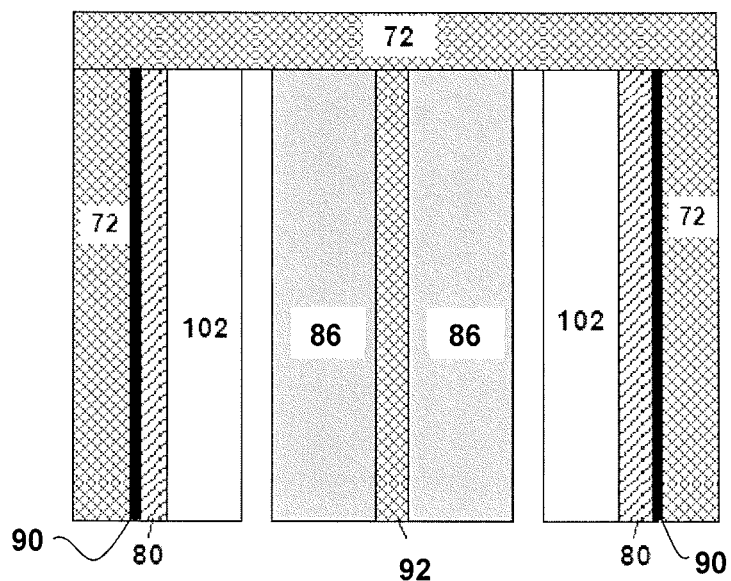
FIGS. 7A and 7B are cross-section views illustrating an exemplary layer of plaque functioning as an actuator to couple a heating element to a fuel unit.
Figure 7B:
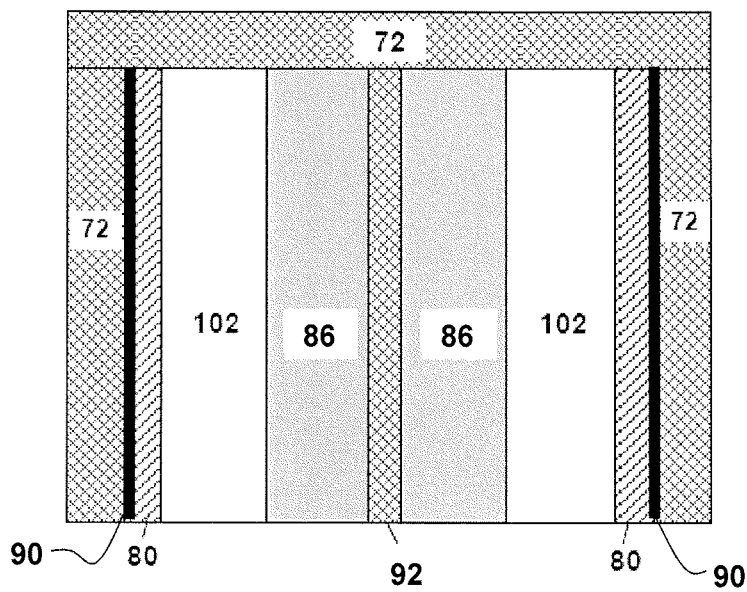
Figure 9:
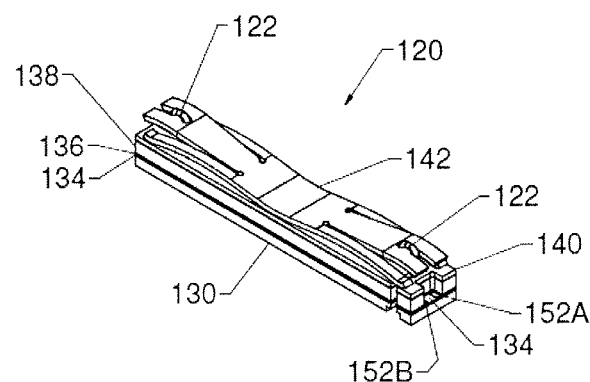
FIGS. 9 and 10 provide a perspective view and an exploded view, respectively, of a thin profile mica heater in accordance with aspects of the present invention.

In another embodiment, illustrated in FIGS. 7A-7B, a layer of plaque 102, made up of from a positive temperature coefficient (PTC) composition that includes a carbon and polymer blend, may be used as an actuator. The PTC composition expands during heating. FIG. 7A illustrates the layer of plaque 102 in the first state; and FIG. 7B illustrates the layer of plaque 102 extended to the second state. The layer of plaque 102 is used to join the heating elements 80 to the conductor sections 22 when the fuel units 86 are inserted in the cavity 74 and the cavity 74 is heated to a temperature sufficient to activate the PTC composition.

Figure 8:
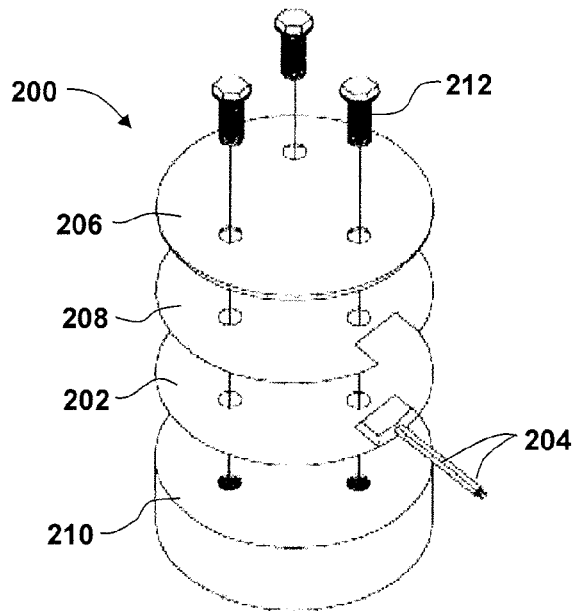
FIG. 8 is an exemplary Mica heater.

Commercial mica heaters are capable of operating at the temperatures required for a thermolysis fuel cartridge, but the mechanism used to clamp them together tends to be thick (e.g., not volume efficient). High energy volume ratios are needed for successful commercialization of thermolysis fuel cartridges. Mica heaters must be clamped together prior to powering and remain clamped from that point onward. Conventional designs accomplish this by clamping with threaded fasteners. An exemplary conventional design is illustrated in FIG. 8, in which the heater assembly 200 includes a mica heater layer 202 connected to an energy source by electrical leads 204, a rigid backing plate 206 adjacent to but separated from one side of the mica heater layer 202 by an electrically nonconductive insulating layer 208, and a thermally conductive support layer 210. The heater assembly 200 is held together by a retainer, such as threaded fasteners 212. The size of these heater assemblies 200 is typically rather large in the dimension perpendicular to the plane of the heater layer 202 due to minimum required thread engagement.

By replacing the threaded fasteners with a tension member and spring, the thickness of the package can be reduced over that required for threaded fasteners. An additional benefit of using a spring to clamp the mica heater together is the ability to maintain clamp force after repeated thermal cycles and for years of storage. Conventional fasteners with short length in tension are prone to losing tension as the portions in compression thin due to time or thermal cycling.

A thin profile mica heater assembly in accordance with aspects of the present invention is illustrated in FIGS. 9-12. Referring to FIGS. 9-12, the thin profile mica heater assembly 120 includes one or more retaining mechanism 122 to securely hold the various layers of the heater assembly 120. The retaining mechanism 122 may be any size and shape. As illustrated in FIGS. 9-12, the retaining mechanism 122 may have a J-hook configuration, which includes an extended portion 124 that extends through each component of the heater assembly 120 and an end portion 126 configured to apply a compressive force on the stack of components. In another embodiment, the retaining mechanism 122 may include a separate E-clip style fastener rather than the J-hook configuration, for example. The retaining mechanism 122 may be coupled to a biasing member 142 (e.g., a spring) to provide the compressive force.

The heater assembly 120 includes a thermally conductive layer 130, which is configured to make contact with the one or more actuators 100 and/or with corresponding conductor sections 22 when the fuel units are inserted in the cavity 74 and the actuators 100 are in the second state. The thermally conductive material layer 130 is in contact with support layer 132. The electrically nonconductive support layer 132 is in contact with the resistive heater layer 134. The resistive heater layer 134 includes one or more electrical contact pads 152A, 152B configured to receive current from one or more power sources. Thermal energy from the resistive heater layer 134 is transferred through the support layer 132 (e.g., a mica layer) to the thermally conductive layer 130, which is coupled to a fuel unit 60, 86 and/or actuator 100 in order to transfer heat generated by the resistive heater layer 134 to the fuel unit 60, 86 and/or actuator 100.

The heater assembly 120 further includes an electrically nonconductive layer 136. Layer 136 can be made from mica. Layer 136 is coupled to a thermally insulative layer 138. Thermally insulative layer 138 is configured to limit thermal energy from passing therethrough. The heater assembly 120 further includes a backing plate 140 for providing support to the heater assembly 120. A spring clamp layer 142 is configured to be bound by the retaining mechanism 122 in order to secure the various layers of the heater assembly 120 in a prescribed manner.

Figure 10:
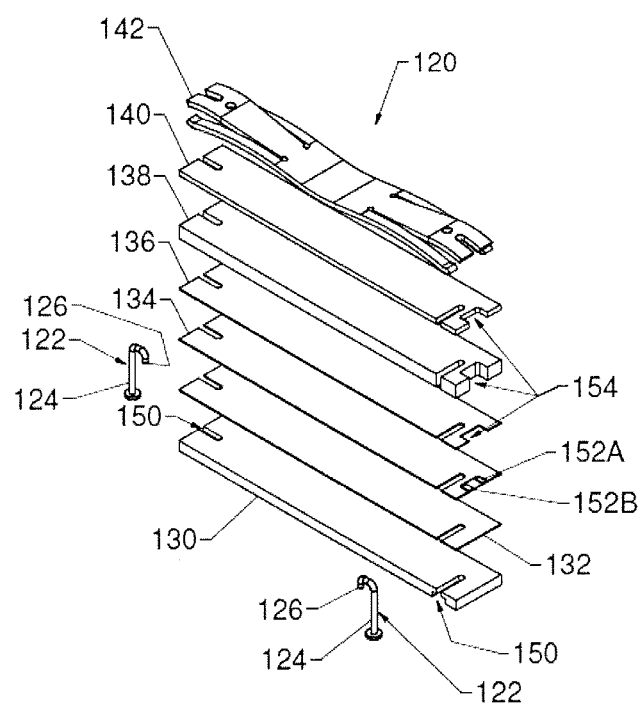
Figure 11:
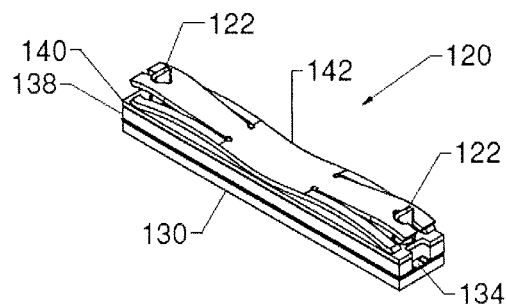
FIGS. 11 and 12 provide a perspective view and an exploded view, respectively, of a thin profile mica heater in accordance with another aspect of the present invention.
Figure 12:
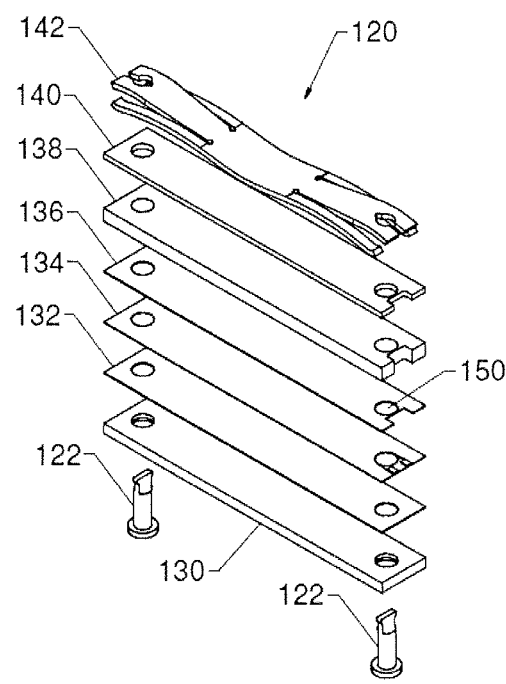

As shown in FIGS. 10 and 12, a variety of mechanisms 150 may be formed or otherwise imparted into each of the component layers (e.g., layers 130-142) to enable securing of the layers 130-142 to form the heater assembly 120. In one embodiment, the mechanism 150 is in the form of a slot, wherein each component layer 130-142 may be slidingly mounted to form the heater assembly 120, as illustrated in FIG. 10. In another embodiment, the mechanism 150 is in the form of a circular void formed or otherwise imparted into each of the component layers (e.g., layers 130-142) to enable securing of the layers 130-142 to form the heater assembly 120, as illustrated in FIG. 12. In the embodiment, illustrated in FIG. 12, each layer 130-142 is placed over or under an adjacent layer 130-142 to foul' the heater assembly 120.

It should further be noted that layers 130-134 are generally formed of similar size and shape. In particular, layer 134 includes a portion on which electrical contact pads 152A, 152B are disposed. In contrast layers 136, 138 and 140 include a void 154 that corresponds to the location of the contact pads 152A, 152B to provide space for attaching electrical leads.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A hydrogen gas generator comprising:
    a housing including a plurality of sidewalls and a rear wall, wherein the plurality of sidewalls and rear wall form a cavity configured to receive one or more fuel units; and
    a heater assembly configured to be at least partially housed within the cavity, the heater assembly comprising a support member, at least one heating element capable of converting electrical to thermal energy, and at least one temperature-sensitive actuator, the at least one heating element and temperature-sensitive actuator being disposed in a stacked arrangement with respect to the support member, and said actuator capable of transforming from a first dimensionally retracted state to a second dimensionally expanded state when heated by the at least one heating element,
    wherein the at least one actuator is in the first state when a temperature of the at least one actuator is below a first prescribed temperature and the at least one actuator is in the second state when a temperature of the at least one actuator is above a second prescribed temperature that is equal to or higher than the first prescribed temperature, and wherein at least one of the at least one heating element or the at least one actuator is displaced closer in proximity to the one or more fuel units when the at least one actuator is in the second state than when the at least one actuator is in the first state.

2. The hydrogen gas generator of claim 1, wherein in the second state the at least one heating element is in conductive thermal communication with at least a portion of the one or more fuel units.

3. The hydrogen generator of claim 1, wherein in the second state, the temperature-sensitive actuator is in contact with and in conductive thermal communication with at least a portion of the one or more fuel units.

4. The hydrogen generator of claim 1, wherein in the second state, the heating element is in contact with at least a portion of the one or more fuel units.

5. The hydrogen gas generator of claim 1, further including a front panel configured to engage the plurality of sidewalls in order to close the housing.

6. The hydrogen gas generator claim 5, further comprising an interlock system, such that when the at least one temperature-sensitive actuator is in the second state, the front panel is more difficult to disengage from the plurality of sidewalls than when the at least one actuator is in the first state.

7. The hydrogen gas generator of claim 1, wherein the at least one temperature-sensitive actuator is a bimetallic element.

8. The hydrogen gas generator of claim 7, wherein the first prescribed temperature is 200 degrees Celsius and the second prescribed temperature is 250 degrees Celsius.

9. The hydrogen gas generator of claim 1, wherein the at least one heating element and at least one thermal actuator are in thermal communication with one another.

10. The hydrogen gas generator of claim 1, wherein the heater assembly extends between two or more fuel cells.

11. A method for heating a fuel unit provided in a hydrogen gas generator of claim 1, the method comprising:
    receiving one or more fuel units in a cavity of the housing;
    applying electrical energy to the at least one heating element, thereby generating heat that is conductively transferred to at least one adjacent temperature-sensitive actuator;
    heating the at least one temperature-sensitive actuator above the first prescribed temperature to the second prescribed temperature, thereby causing the actuator to be in the second dimensionally expanded state; and
    contacting one of the at least one heating element or the at least one actuator to the one or more fuel units for selectively heating the one or more fuel units.

12. The method of claim 11, wherein the at least one actuator is operative to move between the first state and the second state upon reaching one of the first and second prescribed temperatures.

13. The method of claim 11, wherein the at least one actuator momentarily snaps between the first state and the second state upon reaching one of the first and second prescribed temperatures.

14. The method of claim 11, wherein the at least one actuator is a bimetallic element.

15. The method of claim 14, wherein the first prescribed temperature is 200 degrees Celsius and the second prescribed temperature is 250 degrees Celsius.

16. A hydrogen gas generator comprising:
    a housing including a plurality of sidewalls and a rear wall, wherein the plurality of sidewalls and the rear wall form a cavity configured to receive one or more fuel units;
    a heater assembly comprising a support member, at least one heating element capable of converting electrical to thermal energy, and at least one temperature-sensitive actuator, each spatially positioned in an array with respect to one another,
    the at least one heating element and temperature-sensitive actuator being disposed adjacent to one another and said actuator capable of transitioning from a first dimensionally retracted state to a second dimensionally expanded state when heated by the at least one heating element,
    wherein the at least one actuator is in the first state when an actuator temperature is below a first prescribed temperature and the at least one actuator is in the second state when an actuator temperature is above a second prescribed temperature that is equal to or higher than the first prescribed temperature, and wherein at least one of the at least one actuator and the at least one heating element is disposed closer in proximity to the one or more fuel units when the at least one actuator is in the second state than when the at least one actuator is in the first state.

17. The hydrogen gas generator of claim 16, wherein in the second state, the at least one actuator is in contact with at least a portion of the one or more fuel units.

18. The hydrogen gas generator of claim 16, wherein in the second state, the at least one heating element is in contact with at least a portion of the one or more fuel units.

19. The hydrogen gas generator of claim 16, further including a front panel configured to engage the plurality of sidewalls in order to close the housing.

20. The hydrogen gas generator claim 19, wherein when the at least one actuator is in the second state, the front panel is more difficult to disengage from the plurality of sidewalls than when the at least one actuator is in the first state.

21. The hydrogen gas generator of claim 16, wherein the at least one actuator is a bimetallic element.

22. The hydrogen gas generator of claim 21, wherein the first prescribed temperature is 200 degrees Celsius and the second prescribed temperature is 250 degrees Celsius.

23. The hydrogen gas generator of claim 16, wherein the at least one heating element and at least one thermal actuator are in thermal communication with one another.

24. The hydrogen gas generator of claim 16, wherein the heater assembly is mounted to at least one sidewall of the housing, such that the support member is adjacent to the at least one sidewall.

\* \* \* \* \*